(12) United States Patent
Mayor

(10) Patent No.: US 7,190,094 B2
(45) Date of Patent: Mar. 13, 2007

(54) MULTI-PATH COOLING OF A TURBO-GENERATOR ROTOR WINDING

(75) Inventor: Kevin Mayor, Ennetbaden (CH)

(73) Assignee: Alsom Technology Ltd., Baden (CH)

( * ) Notice: Subject to any disclaimer, the term of this patent is extended or adjusted under 35 U.S.C. 154(b) by 0 days.

(21) Appl. No.: 10/794,983

(22) Filed: Mar. 5, 2004

(65) Prior Publication Data

US 2004/0201293 A1    Oct. 14, 2004

(30) Foreign Application Priority Data

Mar. 7, 2003  (GB) ................................ 0305300.6

(51) Int. Cl.
  *H02K 1/32*   (2006.01)
(52) U.S. Cl. ................. 310/61; 310/60 A; 310/59
(58) Field of Classification Search .......... 310/58, 310/61, 52, 60 A, 270, 59, 64, 65
See application file for complete search history.

(56) References Cited

U.S. PATENT DOCUMENTS

| | | | |
|---|---|---|---|
| 2,787,721 A | 4/1957 | Tudge | 310/61 |
| 4,395,816 A * | 8/1983 | Pangburn | 29/598 |
| 4,634,910 A | 1/1987 | Schöllhorn | 310/214 |
| 5,477,095 A | 12/1995 | Kleinburger et al. | 310/215 |
| 5,777,406 A | 7/1998 | Bomba et al. | 310/61 |
| 6,204,580 B1 * | 3/2001 | Kazmierczak | 310/52 |
| 6,252,318 B1 * | 6/2001 | Kazmierczak | 310/61 |

FOREIGN PATENT DOCUMENTS

| | | |
|---|---|---|
| DE | 1036370 | 8/1958 |
| DE | 1120575 | 12/1961 |
| DE | 1 538 869 | 4/1970 |
| DE | 4011450 | 10/1991 |
| DE | 196 21 058 | 11/1997 |
| EP | 0 173 877 | 3/1986 |
| FR | 1 081 706 | 12/1954 |
| GB | 746005 | 3/1956 |
| GB | 746168 | 3/1956 |
| GB | 847073 | 9/1960 |

OTHER PUBLICATIONS

European Search Report for EP 04 10 0762, Jun. 18, 2004, 3 pages.

* cited by examiner

*Primary Examiner*—Dang Le
(74) *Attorney, Agent, or Firm*—Darby & Darby

(57) ABSTRACT

A turbo-generator includes a rotor body and a rotor winding disposed around the rotor body. The rotor winding including a sub slot, a first axial cooling duct having a first inlet and a first outlet, and a second axial cooling duct disposed adjacent and parallel to the first axial cooling duct for multi-path cooling. The second axial cooling duct has a second inlet and a second outlet. The first inlet is disposed offset from the second inlet and the first outlet is disposed offset from the second outlet.

13 Claims, 3 Drawing Sheets

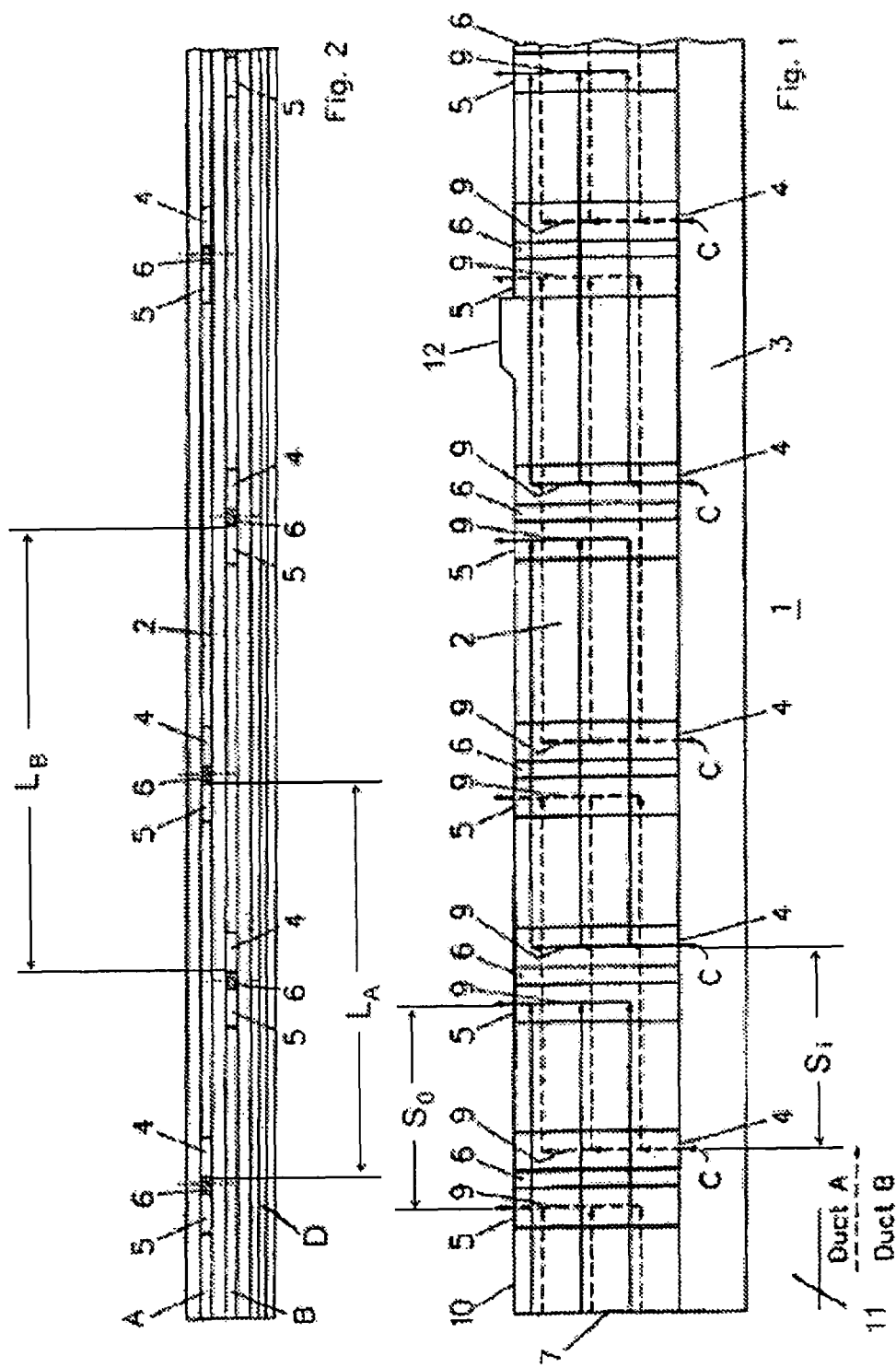

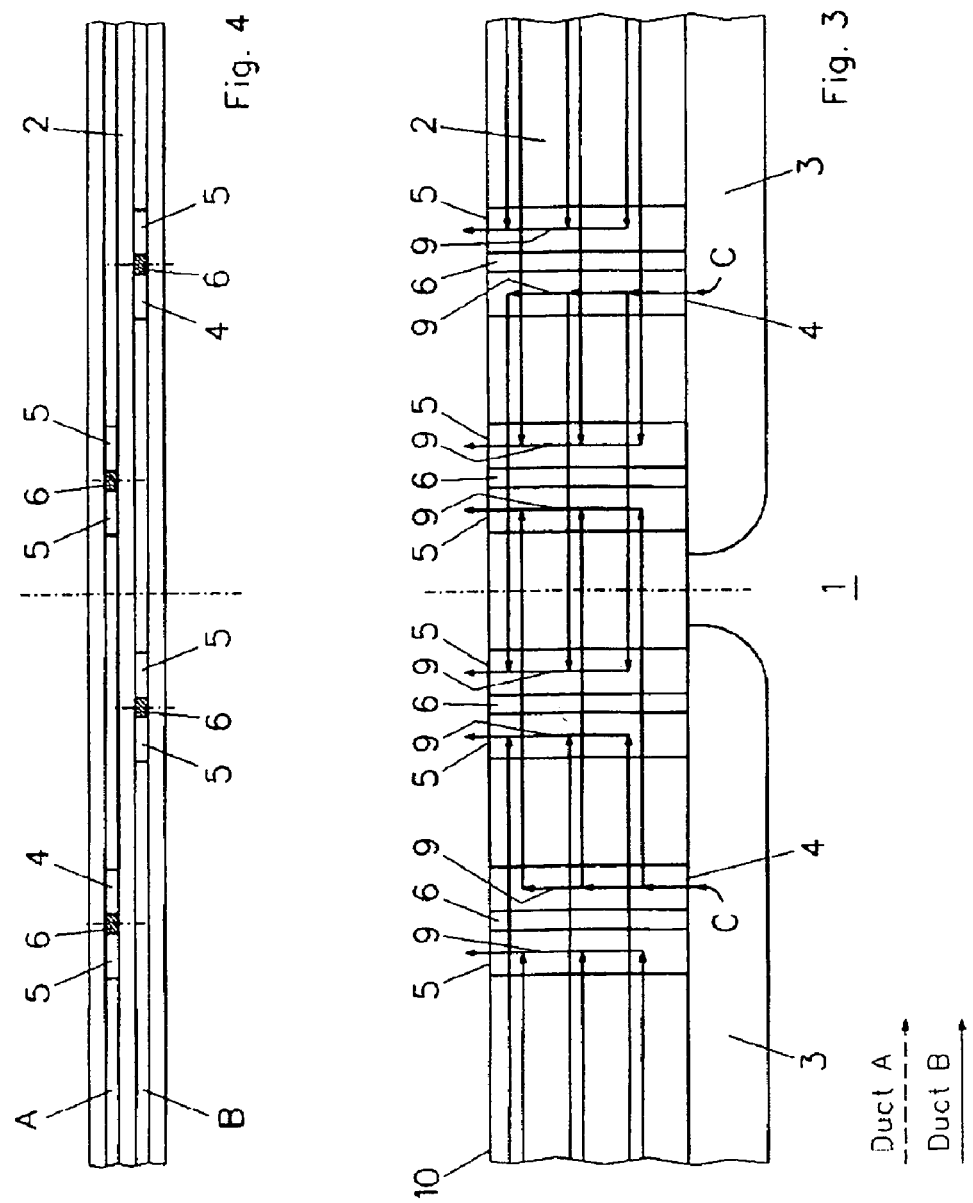

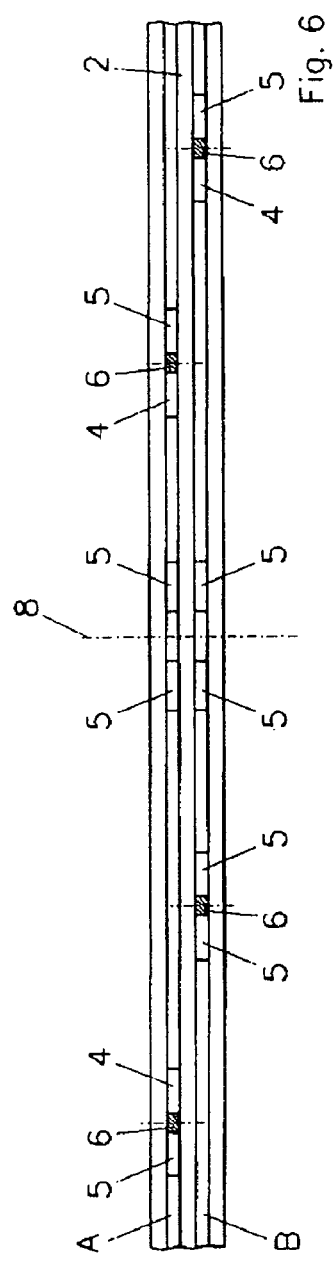
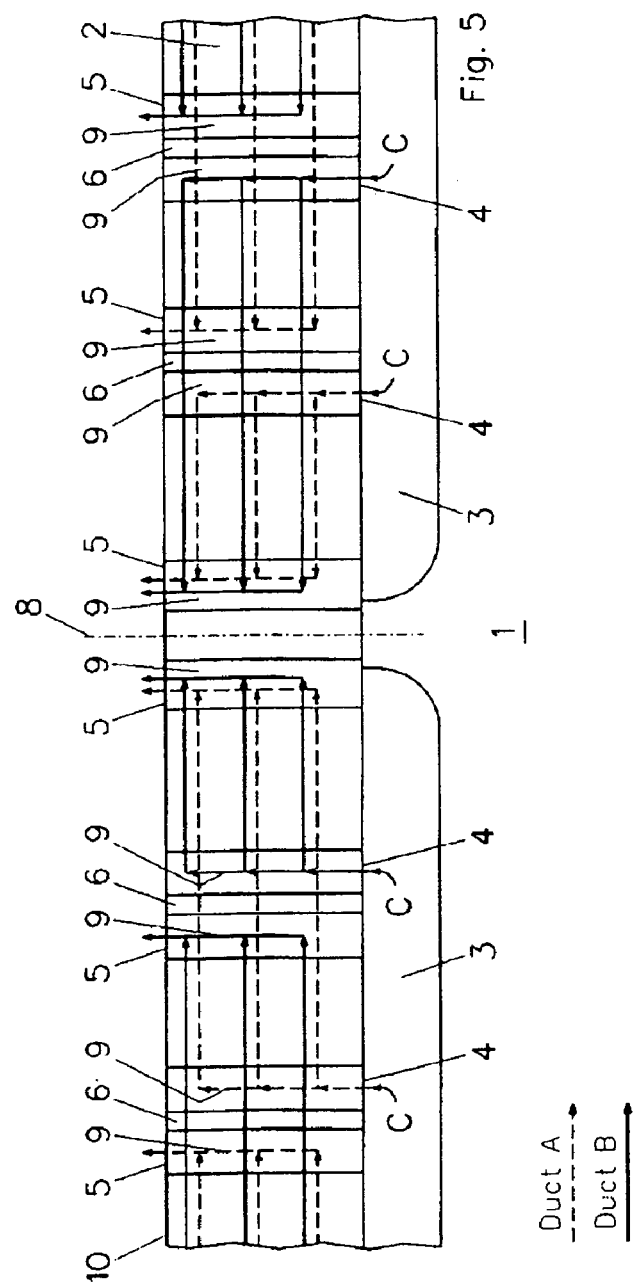

MULTI-PATH COOLING OF A TURBO-GENERATOR ROTOR WINDING

Priority is claimed to United Kingdom Patent Application No. GB 0305300.6, filed on Mar. 7, 2003, the entire disclosure of which is incorporated by reference herein.

The present invention relates generally to the field of dynamo electric machines, and particularly to a turbo-generator having a rotor and a stator concentrically surrounding the rotor and separated from the rotor by an air gap, and having a cooling arrangement with cooling fluid flowing through corresponding cooling passages in the rotor.

BACKGROUND

To ensure trouble-free operation and to utilize the full output potential of a turbo generator, large generators must be cooled in order to dissipate the heat loss which occurs in the windings and cores of the rotor and stator. A fluid such as air or even hydrogen is generally used for the cooling and is fed through corresponding bores or slits in the rotor and stator and then cooled down again in a cooler.

In the rotor, the cooling medium flows axially from the ends into corresponding bores of the rotor conductor toward the inside, issues radially into the air gap between stator and rotor after absorbing the rotor heat loss, and can then flow either axially in the air gap outward, or radially through cooling channels in the stator core.

The laid open German patent application DE 40 11 450 A1, which is incorporated by reference herein, describes a simple radial cooling scheme for a rotor winding of a turbo generator. According to this disclosure, the cooling gas enters the rotor winding via a sub slot which is machined below the main winding slot. The gas then passes radially outwards through ventilation holes in the winding conductors to the air gap of the machine. According to this scheme, the radial holes are inclined in order to achieve a better flow condition within the cooling channels and improve the cooling compared to pure radial flow machines.

Other cooling schemes describe the use of one or more inner channels within the conductor. A cooling medium passes through these channels axially for a certain distance before exiting the conductor. The inlets and outlets to and from these axial sections are generally formed by radial cooling ducts similar to pure radial cooling schemes.

The German laid open patent DE 1 036 370, related to U.S. Pat. No. 2787721, both of which are hereby incorporated by reference herein, describes a cooling scheme wherein each conductor has a single axial duct. The cooling medium passes through these single axial ducts. In this case, the cooling medium, generally gaseous air or hydrogen, is fed to the conductor stack in the slot portion from a sub slot machined below the main winding slot. The gas then passes axially along the conductors in both the forward and reverse direction based on the flow direction in the sub slot. After a certain distance the gaseous medium exhausts radially into the air gap.

The German laid open patent DE 1 120 575, which is incorporated by reference herein, describes a similar cooling scheme with each conductor having two axial ducts for the flow of the coolant. Each axial duct is fed in a way similar to that described for DE 1 036 370. The arrangement of the radial gas inlets and outlets to each axial duct is axially offset such that a cross flow arrangement in adjacent ducts is achieved. This cross flow scheme serves to reduce the temperature hotspots within the conductor closer to that of the average conductor temperature for that section of the winding.

SUMMARY OF THE INVENTION

All of the known cooling schemes described above have draw backs and insufficiencies. With pure radial or axial cooling schemes, the hotspot temperature is dependent on the length of the axial section of the winding. It is not reduced by cross flow cooling within adjacent ducts. However, the cross flow schemes rely on gas flow from the sub slot reversing its flow direction to travel in the cross flow sense in some of the cooling paths. This reversal of the flow direction may result in low flow conditions within the lower sections of the coil stack. The effect of this condition can be reduced by a higher flow in the adjacent duct and (depending on the winding insulation arrangement) by radial conduction of heat within the coil and to the coolant in the subslot.

Accordingly, an object of the present invention is to provide a turbo-generator having a rotor with an improved cooling scheme of the rotor windings to minimize the hotspot temperature within the rotor winding conductors. A further or alternate object of the present invention is to provide a turbo-generator having a rotor with an improved cooling scheme while keeping manufacturing costs low and reliability high.

The present invention provides a turbo-generator having a rotor with multi-path cooling, the rotor comprising a rotor winding arranged around a central rotor body each rotor conductor having axial cooling ducts and a sub slot below the main winding slot, characterized in that the axial cooling ducts are provided as parallel twin ducts for multi path cooling, the inlets and outlets of the flow paths in adjacent axial ducts within one conductor being offset from each other.

According to the present invention the cooling gas passes through twin axial ducts in the rotor conductors and is fed to these axial ducts from a sub slot situated beneath the main winding slot. The flow in these conductors is fed in such a way that the coolant flow direction within the sub slot is maintained within the individual conductors. The inlets from the sub slot and exhausts to the machine air gap are arranged such that multiple, parallel flow paths exist through the slot portion of the rotor winding. The number of parallel flow paths is greater than or equal to three.

Each flow path comprises one or more inlets from the sub slot which feeds one or more conductors within the coil stack; an axial path length within one of the axial ducts within the stack of conductors; and an exhaust vent to the machine air gap.

The inlets and outlets of the flow paths in the adjacent axial ducts within one conductor are offset from each other by a length which is a part of the length of the axial portion of the flow path within the conductors, preferably half the length. This offset of the inlets and outlets serves to minimize the hotspot temperature within the rotor winding conductors.

The arrangement of maintaining the flow direction from the sub slot ensures a more even flow distribution of the fluid flow within the conductors than the cooling schemes known in the prior art in which the flow direction is reversed.

Thus, the present invention achieves a good flow distribution within the conductor stack by keeping a forward flow direction in the conductors compared to the sub slot. Further, the present invention limits the conductor hotspot temperature by offsetting the inlets and outlets in adjacent ducts.

A preferred embodiment of the present invention provides a cross flow arrangement at the center of the rotor winding where the winding sections fed from each end of the rotor meet. This cooling arrangement has the advantage that the feeding of fluent from the sub slot is more evenly distributed. Further, a more even distribution of exhaust fluid into the air gap is provided. This reduces the risk of the rotor exhaust flow affecting the stator cooling scheme.

An alternative embodiment of the present invention provides no cross flow at the center of the rotor winding by arranging the outlets from the axial ducts to be aligned at the center of the rotor winding.

Optionally the axial ducts are enlarged where necessary to provide for a higher flow rate and a better temperature control.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a first preferred exemplary embodiment of the present invention in a schematic longitudinal section of one side of the rotor winding;

FIG. 2 shows a schematic top view of the embodiment of FIG. 1;

FIG. 3 shows a second exemplary embodiment of the present invention in a schematic longitudinal section of one side of the rotor winding;

FIG. 4 shows a schematic top view of the embodiment of FIG. 3;

FIG. 5 shows a third exemplary embodiment of the present invention in a schematic longitudinal section of one side of the rotor winding;

FIG. 6 shows a schematic top view of the embodiment of FIG. 5.

DETAILED DESCRIPTION

Referring now to the drawings, wherein like reference numerals designate identical or corresponding parts throughout the several views, a first preferred exemplary embodiment of the invention is reproduced in FIG. 1 in a schematic longitudinal section of one half of a rotor 1.

The upper portion is representing the rotor winding 2 made of E-section or tubular copper as conductor and the lower elongated channel is representing the sub slot 3 for feeding coolant C to the winding 2. The sub slot 3 is arranged between a shaft of the, rotor and the winding 2. In the drawing of FIG. 1, the left edge represents the rotor body end 7.

In FIG. 1 the axial cooling ducts A are represented by dashed lines and the axial cooling ducts B are represented by solid lines. The axial cooling ducts A and B, having lengths $L_A$ and $L_B$, respectively (see FIG, 2), are provided as twin ducts for unidirectional multi path cooling.

The axial ducts A and B are respectively connected through radial ducts 9 and inlets 4 with the sub slot 3 and through radial ducts 9 and outlets 5 with the outer circumference 10. Cross flow between adjacent inlets 4 and outlets 5 is prevented by locally restricting or blocking the axial channel between them, for instance by a flow baffle 6. Optionally, further cooling ducts may be disposed adjacent to axial ducts A and B, for example third axial cooling duct D, which is shown schematically in FIG. 2.

Referring to FIG. 1 and 2, wherein FIG. 2 shows a schematic top view of the embodiment of FIG. 1, the radial inlets 4 and radial outlets 5 of the flow paths in adjacent axial ducts A and B within one conductor are arranged offset from each other by an offset distance $S_i$ and $S_o$ respectively, i.e. they do not run parallel to each other over the whole length but rather over a part of the whole length.

Therefore, starting from the left edge of FIG. 1, duct A ends at about half the length of duct B and vents through outlet 5 on the outer circumference 10 of the rotor winding 2. Continuing in the flow direction, right behind outlet 5 an inlet 4 is arranged at the lower end of the winding 2 which is fed by coolant C provided through the sub slot 3. Subslot 3 is disposed beneath main slot 11. which is shown schematically in FIG. 1.

At the next outlet 5 of the duct B, duct A continues. Right behind outlet 5 of duct B, inlet 4 feeds coolant from the sub slot 3 through the radial duct 9 to duct B. This means, duct A is arranged off set from duct B.

Due to this offset arrangement of the axial ducts A and B, the hot spot temperature can be greatly reduced towards the mean temperature over the whole rotor winding. Hot spots are effectively reduced. Optionally the axial ducts may be enlarged where necessary to provide for a higher flow rate and a better temperature control. FIG. 1 schematically shows an enlarged portion 12 of duct B.

FIG. 3 shows a second exemplary embodiment of the present invention in a schematic longitudinal section of the one side of the rotor winding. FIG. 4 shows a schematic top view of the embodiment of FIG. 3. Contrary to the unidirectional multi-path cooling arrangement shown in FIGS. 1 and 2, the embodiment according to FIG. 3 shows a cross flow arrangement, i.e. in the portion around the rotor center line 8, coolant flows in opposite directions in the axial ducts.

Further, inlets 4 and outlets 5 are not alternating in the cross flow area, as can be seen from the two parallel outlets 5 on both sides of the rotor center line 8. This arrangement according to the second embodiment is especially suitable for long axial duct length to effectively reduce hot spots in the rotor center line section.

FIG. 5 shows a third exemplary embodiment of the present invention in a schematic longitudinal section of one side of the rotor winding. FIG. 6 shows a schematic top view of the embodiment of FIG. 5. FIG. 5 shows an arrangement where the unidirectional flow arrangement is maintained throughout the winding, i.e. in the portion around the rotor center line 8, coolant outlets (5) from ducts A and B, originating from both ends of the rotor are positioned. In FIG. 5 no cross flow results for coolant flow at the rotor center line.

It has to be noted that the arrangement according to the first embodiment and the arrangement according to the second embodiment can be combined in one arrangement to enhance the positive effect of the present invention.

Obviously, numerous modifications and variations of the present invention are possible in light of the above teachings. It is therefore to be understood that, within the scope of the appended claims, the invention may be practiced otherwise than as specifically described herein.

What is claimed is:

1. A turbo-generator comprising:
   a rotor body defining an axis; and
   a rotor winding disposed around the rotor body, the rotor winding including a sub slot, a plurality of first axial cooling ducts disposed in an axial direction and axially adjacent to each other and axially separated from each other by a first flow baffle to prevent cross flow, each first axial cooling duct having a first inlet and a first outlet, and a plurality of second axial cooling ducts disposed adjacent and parallel to the first axial cooling ducts and axially adjacent to each other for multi-path cooling, each of the second axial cooling ducts having a second inlet and a second outlet, wherein each first inlet is disposed axially offset from a respective second inlet and each first outlet is disposed axially offset from a respective second outlet.

2. The turbo-generator as recited in claim 1, further comprising a main slot adjacent to the sub slot.

3. The turbo-generator as recited in claim 1, further comprising at least a third axial cooling duct disposed adjacent to at least one of the first and second axial cooling ducts.

4. The turbo-generator as recited in claim 1, wherein the first and second inlets communicate with the sub slot and the first and second outlets communicate with an outer circumference of the winding.

5. The turbo-generator as recited in claim 1, wherein the first and second inlets and the first and second outlets are disposed such that a direction of coolant flow in each of the first and second axial ducts is the same as a direction of coolant flow in the subslot.

6. The turbo-generator as recited in claim 1, wherein, at a center of the rotor winding, a flow cross-flow of a coolant through at least one of the first and second axial ducts is permitted.

7. The turbo-generator as recited in claim 1, wherein, at a center of the rotor winding, at least one of the first and second outlets are disposed so as to prevent a cross-flow of coolant through the respective first or second axial duct.

8. The turbo-generator as recited in claim 1, wherein at least a portion of one of the first and second axial ducts is enlarged.

9. A turbo-generator comprising:
a rotor body; and
a rotor winding disposed around the rotor body, the rotor winding including a sub slot, a plurality of first axial cooling ducts disposed axially adjacent to each other and axially separated from each other by a first flow baffle to prevent cross flow, each first axial cooling duct having a first inlet and a first outlet, and a plurality of second axial cooling ducts disposed adjacent and parallel to the first axial cooling ducts and axially adjacent to each other for multi-path cooling, each of the second axial cooling ducts having a second inlet and a second outlet, wherein each first inlet is disposed offset from a respective second inlet and each first outlet is disposed offset from the a respective second outlet, wherein a distance of the offset between first and second inlets is equal to a portion of a length at least one of the first and second axial ducts, and wherein the first outlet and the first inlet of axially adjacent first axial cooling ducts are axially separated by a flow baffle.

10. The turbo-generator as recited in claim 9, wherein the lengths of each of the first and second axial ducts are equal.

11. The turbo-generator as recited in claim 9, wherein the portion is one-half.

12. A turbo-generator comprising:
a rotor body; and
a rotor winding disposed around the rotor body, the rotor winding including a sub slot, a plurality of first axial cooling ducts disposed axially adjacent to each other and axially separated from each other by a first flow baffle to prevent cross flow, each first axial cooling duct having a first inlet and a first outlet, and a plurality of second axial cooling ducts disposed adjacent and parallel to the first axial cooling ducts and axially adjacent to each other for multi-path cooling, each of the second axial cooling ducts having a second inlet and a second outlet, wherein each first inlet is disposed offset from a respective second inlet and each first outlet is disposed offset from a respective second outlet, wherein a distance of the offset between first and second outlets is equal to a portion of a length at least one of the first and second axial ducts, and wherein the first outlet and the first inlet of axially adjacent first axial cooling ducts are axially separated by a flow baffle.

13. A rotor winding for multi-path cooling of a rotor defining an axis in a turbo-generator, the rotor winding comprising:
a main slot supplying a coolant;
a sub slot disposed adjacent to the main slot;
a plurality of first axial cooling ducts disposed in an axial direction and axially adjacent to each other and axially separated from each other by a first flow baffle to prevent cross flow, each first axial cooling duct having a first inlet connecting the sub-slot and a first outlet communicating with an outer circumference of the winding;
a plurality of second axial cooling ducts disposed adjacent and parallel to the first axial cooling ducts and axially adjacent to each other and each having a second inlet connecting the sub slot and a second outlet communicating with the outer circumference, wherein each first inlet is disposed axially offset from a respective second inlet and each first outlet is disposed axially offset from a respective second outlet.

* * * * *

UNITED STATES PATENT AND TRADEMARK OFFICE
CERTIFICATE OF CORRECTION

| | | |
|---|---|---|
| PATENT NO. | : 7,190,094 B2 | |
| APPLICATION NO. | : 10/794983 | |
| DATED | : March 13, 2007 | |
| INVENTOR(S) | : Kevin Mayor | |

It is certified that error appears in the above-identified patent and that said Letters Patent is hereby corrected as shown below:

On the Title Page (73)

In the Assignee:

Please delete "Alsom Technology Ltd., Baden (CH)" and insert --Alstom Technology Ltd., Baden Switzerland--

Signed and Sealed this

First Day of May, 2007

JON W. DUDAS
*Director of the United States Patent and Trademark Office*